July 8, 1952 C. O. SANDSTROM 2,602,644
EVAPORATOR
Filed Sept. 19, 1949 2 SHEETS—SHEET 2
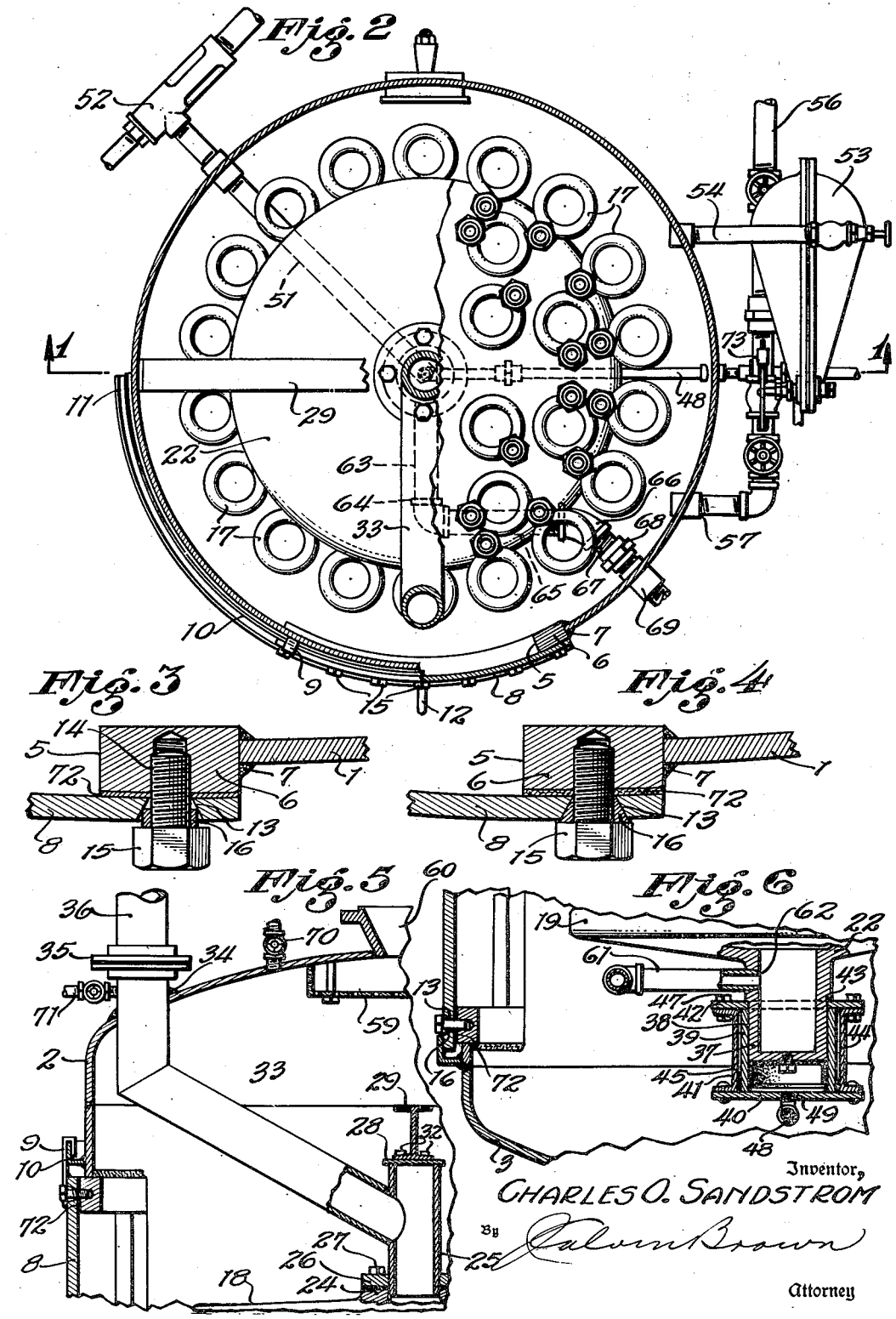
Inventor,
CHARLES O. SANDSTROM
By Calvin Brown
Attorney Patented July 8, 1952

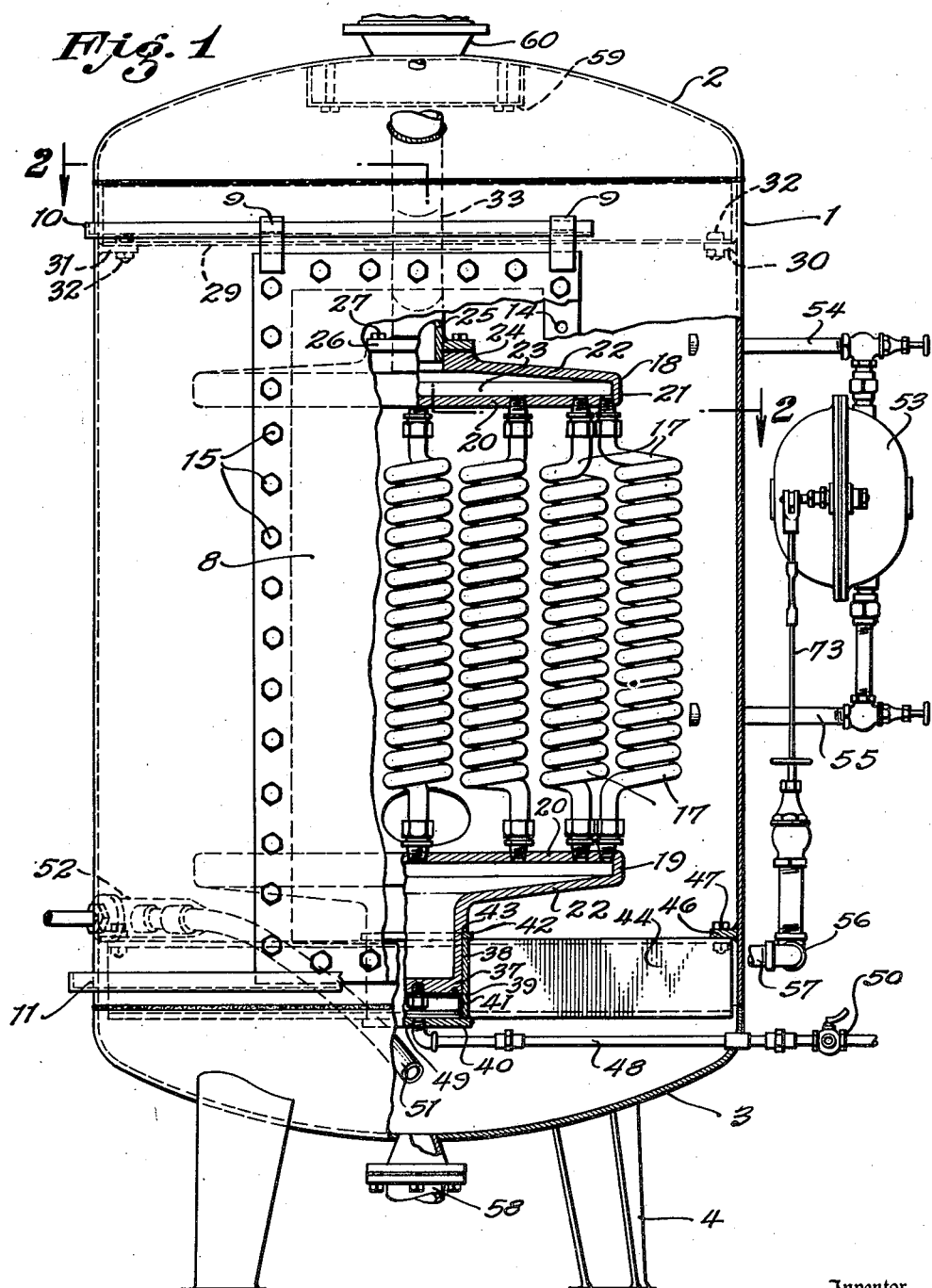

2,602,644

UNITED STATES PATENT OFFICE 2,602,644

EVAPORATOR

Charles O. Sandstrom, Los Angeles, Calif.

Application September 19, 1949, Serial No. 116,579

3 Claims. (Cl. 257—1)

1

The present invention relates to evaporators of a type which may be utilized for the purpose of producing pure water from contaminated water and sea water. The invention has other adaptations, such as for the concentration of many liquids of the food and the chemical industry.

In the conventional evaporator it is necessary to remove the entire heat transfer element, or bank of coils or tubes, for the removal of scale and for replacement of defective parts. This requires considerable space; space that is at a premium in some locations, notably aboard ship. In the present invention I have provided an evaporator which, by means of various details hereinafter described, occupies a minimum of space and does not require the withdrawal of the heating element.

It is common practice to provide in sea-going boats one or more evaporators, into which sea water is fed and which sea water is acted upon so that substantially salt free water is recovered while the brine is removed by an ejector, eductor or pump, and returned to the ocean. There are different requirements as to concentrations of brine. It has been found, however, that the ejector, eductor or pump should continuously remove certain proportions of the brine while admiting fresh sea water to the evaporator in order that the brine concentration should not exceed a certain amount or should be maintained at a certain desired concentration.

The concentrator of the present invention includes a tank within which is placed helical coils, the coils are adapted to have steam passed therethrough for heat transfer to the liquid in the tank and surrounding the helical coils.

With use, the outer surface of the helical coils develop scale and this scale is difficult to remove. I am aware of the fact that it has heretofore been proposed to alternately introduce steam and then cold water into the coils for the purpose of creating a thermal shock, which shock is supposed to loosen the scale. However, since the expansion or contraction of a three foot length of copper tubing under a temperature differential of 300° F. is only $\frac{1}{16}$ of an inch, the effectiveness of the thermal shock method is of doubtful value.

An object of my invention is to provide a positive means for flexing the coils in such a manner as to remove accumulated scale therefrom. A positive flexing of several inches is produced in the helical coils by my invention.

The invention also contemplates a door of arcuate character conforming to the curvature of the tank of the evaporator, and which door may be moved from a closed to an open position to permit inspection of the interior of the tank, and specifically the helical coils, whereby repairs may be made to the coils, such as removal and replacement thereof in a simple and expeditious manner.

A further object of the invention is the provi-

2 sion of positive means for holding the door sealed over an inspection opening in the evaporator tank, and in such a manner that radial and tangential stresses in the door are effectively resisted.

Other objects of the invention include an evaporator of simple construction, inexpensive in cost of manufacture, and generally superior to evaporators now known to the inventor.

With the above mentioned and other objects in view, the invention consists in the novel and useful provision, formation, construction, association and relative arrangement of parts, members and features, all as shown in one embodiment in the accompanying drawings, described generally, and more particularly pointed out in the claims.

In the drawings:

Figure 1 is a fragmentary elevation, partially in section, on the line 1—1 of Figure 2, of the evaporator;

Figure 2 is a fragmentary sectional view on the line 2—2 of Figure 1;

Figure 3 is a fragmentary sectional view of means for securing the door to the door jamb of the tank;

Figure 4 is a view similar to Figure 3, the bolt being in a changed position;

Figure 5 is a fragmentary detail, partly in section, of the steam inlet of the evaporator; and Figure 6 is a fragmentary detail, partly in section, of means for flexing the helical steam coils of the evaporator.

Referring now to the drawings, the evaporator includes a tank or shell 1 provided with top and bottom heads 2 and 3 respectively, of usual concavo-convex form, with legs 4 carried by the bottom head and supporting the tank in a manner whereby its axis is vertical. The body of the tank is cylindrical in form, as is usual practice, and interrupted to provide an elongated opening in its side wall, as shown at 5. Bounding the said opening is an enlargement constituting a rectangularly formed door jamb 6. The door jamb is fastened to the tank body in any approved manner, such as by welding as indicated at 7. The door jamb extends transversely inwardly, as well as outwardly, of the tank, see Figure 2. It is intended that an arcuate door 8, conforming to the radius or curvature of the tank, should be detachably secured to the jamb 6. The door when detached from the door jamb, as hereinafter set forth, may be positioned at one side of the opening 5 to expose said opening. To accomplish this, the door is provided with two or more spaced apart strap hangers 9 at the top thereof, which hangers overlie and are carried by an arcuate angle iron 10 welded or otherwise secured to the periphery of the upper end of the tank. The bottom of the door is received within the confines of an arcuate angle iron 11 welded or otherwise secured adjacent the bottom of the tank and externally thereof, see Figure 1. A handle 12 secured to the outer surface of the door permits the door to be moved within the arcuate angle iron members.

When the door is closed over the door jamb, the door is secured to said jamb in such a manner as to be fluidtight. To accomplish this, the door is provided with spaced transverse and vertical rows of openings 13 of conical or countersunk form. The door jamb is provided with spaced tapped bores 14 for receiving bolts 15. As considerable pressure is exerted within an evaporator, it is essential that the bolts withstand a shearing force due to the tension in the door, as well as tension due to radial pressure in the shell. It is evident that the door, being on an arc of a circle concentric with the shell, is subjected to tangential or to "hoop" stress, as well as radial pressure, in the same manner as the shell of the tank. Bolts fitting loosely in the holes would be entirely inadequate to resist the tangential stress by friction of the clamped surfaces except under very low pressures. And tight fitting bolts would require accuracy of assembly hardly warranted in such constructions as the shells of pressure vessels, I have as a part of my invention provided a means which effectively resists the forces imposed upon said bolts by the stresses mentioned.

This means includes a soft or deformable metal washer 16 which may be lead, aluminum or other soft metal which surrounds the shank of the bolt and is adapted to be compressed within the conical bore 13 when the bolt is turned within the threaded opening 14 of the jamb. Thus, the soft metal ring 16 will deform from the substantially uniform thickness thereof as shown in Figure 3 to the form shown in Figure 4, wherein the ring completely fills and conforms to the shape of the conical bore 13. Thus, the bore is filled with this soft metal and the stresses heretofore mentioned are effectively resisted.

Within the tank are a multiple number of helical coils 17, the ends of which coils connect with upper and lower manifolds 18 and 19 respectively. The manifolds in each instance may be in the form of a casting having a bottom wall 20, a side wall 21, and a top wall 22, which is inclined with respect to the plane of the bottom wall. This provides a space 23 between the walls. The top wall of the upper manifold is externally annularly flanged at 24.

A tube 25 is received within the flange 24 and communicates with the space 23 of the manifold. This tube has externally secured thereto a collar or flange 26 which is transversely bored to permit passage therethrough of bolts 27, the threads of which are received within threaded openings in flange 24 for securing the two flanges together. The tube 25 is provided with a cap 28, which cap is bolted to a diametrically disposed beam 29 internally secured to the shell.

In Figure 1, I have shown a means for securing the beam 29 which takes the form of brackets 31 and 30, and the bottom flange of the beam extends between and rests upon said brackets. Bolts designated generally as 32 secure the beams to said brackets.

A pipe 33 communicates with the tube 25, see Figure 5, and extends outwardly through the head 2, the pipe being welded or otherwise secured to said head, as indicated at 34. This pipe is provided with a flanged type coupling 35, to which a further pipe 36 is connected, the pipe 36 leading to a source of steam supply. This source may be a steam boiler of some type.

The lower manifold 19 is constructed in a manner similar to that of the upper manifold, so far as base, side wall and top wall are concerned, the difference residing in that the wall 22 has an integrally formed outwardly projecting piston 37 on the crown of said wall. This piston is externally reduced in diameter at 38 and the reduced diameter portion is adapted to be received within a cylinder 39. The cylinder takes the form of a large diameter tube provided with a head 40. While I have shown in Fig. 1 the cylinder and the head as separate, it is obvious that such a construction may be integral. The piston head is provided with a packing or washer 41. Flange 42 is carried by the upper end of the cylinder, and the shoulder 43, formed by reducing the external diameter 38 of the piston, may engage said flange 42 to limit downward stroke of the piston.

The cylinder 39 is supported by a pair of supporting members 44 and 45 which extend substantially diametrically of the shell. These supporting members are held to the shell with internal brackets 46, the supports being bolted or otherwise secured, as indicated at 47 to said brackets. The flanges of the supporting members may be bolted or otherwise secured to the cylinder head 40, and the flange 42.

Both members 20 of the manifolds 18 and 19 are provided with tapered transverse screw threaded bores to permit coupling engagement of ends of the coils 17 with said manifolds. As this is conventional practice, the couplings will not be described in detail.

A pipe 48 extends inwardly and outwardly of the head 3, said pipe carrying fittings and couplings whereby one end communicates with the cylinder 39, as shown at 49. Externally of the head 3, the pipe is provided with a three-way valve 50. The pipe otherwise communicating with a source of liquid under pressure, the intent being that movement of the valve in one direction will direct fluid under pressure into the cylinder to move the piston in one direction and movement of the valve in a second direction exhausting the liquid from the cylinder to permit movement of the piston in an opposite direction.

Certain other details of the evaporator are common in the art, such as for instance the means for continuous blowdown of liquid where the brine concentration, if salt water is the liquid to be acted on, is maintained at a certain salinity. Such a pipe is shown at 51 and comprises a pipe having an open end positioned above the inner surface of the head 3, the other end connected externally to means 52 comprising an ejector, eductor or pump, whereby for every gallon of salt water admitted within the evaporator, a certain amount of the brine solution is removed by the blowdown.

The means for admitting salt water within the evaporator is shown in Figures 1 and 2 and includes a liquid level control member 53 having a valved pipe connection 54 with an upper zone of the evaporator shell, that is to say, above the normal liquid level in said shell and a lower valved pipe connection 55 communicating with any liquid within said shell and at some zone between the top of the surface of the liquid and the bottom of the shell.

The evaporator feed pipe 56 is provided with the usual valve interposed between the by-pass pipes. The evaporator feed pipe finally terminates in a feed pipe which leads, as shown at 57, to the interior of the shell.

Other portions of the evaporator include a clean-out for the tank. This consists of a pipe which depends from the bottom head 3 and carries a flange, to which may be secured a second pipe flange, the pipe 58 of which leads to a means adapted to remove scale and to empty the tank.

The head 2 is internally provided with a perforated dry pan 59 which prevents surge of liquid in the ordinary manner, and immediately above the dry pan is a vapor outlet means 60.

A condensate outlet is provided at 61 and takes the form of a pipe having communication with the interior of the piston, as shown in Figure 6 at 62. This condensate outlet is flexible to allow for movement of the piston during expansion and contraction of the helical coils 17. As shown in Figure 2, the condensate outlet pipe 61 extends radially from the piston as indicated by the dotted lines 63, and then provided with a 90° elbow 64 to which is connected a further length of pipe 65 which pipe is connected to a 45° elbow 66, the elbow in turn connected to a short length of pipe 67 which, through the medium of the union 68, connects with the external condensate outlet pipe 69.

Various vents are provided as conveniences for the evaporator, as shown at 70 and 71.

The operation, uses and advantages of the invention are as follows:

I assume that the parts are in the position shown in the several figures and that the door is secured tightly to the door jamb, there being provided between the inner surface of the door and the outer surface of the jamb a gasket 72 prior to turning the bolts to tighten the door against said gasket 72 and to deform the soft metal rings 16 from the shape shown in Figure 3 to that of Figure 4. If salt water is to be vaporized so as to obtain drinking water or boiler feed water therefrom, this salt wtaer is admitted by proper control of the several valves connected with the evaporator feed pipe 56 into said shell, the height of said water being controlled by the liquid level control means 53. While said control means 53 is not detailed, it is common in the art, and usually consists of a float on the end of an arm, which arm moves the linkage 73 to open or close a feed control valve.

The steam is admitted through the steam inductor pipe 33 into the upper manifold thence through the coils 17, the condensate being received in the lower manifold and removed therefrom through the condensate outlet piping arrangement. The ejector, eductor, or pump arrangement shown at 51 and 52 is constantly removing salt water from the evaporator in accordance with the predetermined brine concentration. During this removal, fresh salt water is admitted within the evaporator. A heat transfer sufficient to vaporize the salt water is required, the vapors escaping through the vapor outlet 60, and conducted to a suitable condenser or distiller.

After a given period of time, scale will form on the external surfaces of the coils, and this scale may be quickly removed by operating the valve 50 to cause liquid under pressure to enter the cylinder and move the piston 37 inwardly of the cylinder 39 which will contract the coils, and by operating the valve in an opposite direction, the coils, due to their own elasticity will then react and move downwardly moving the piston within the cylinder. The alternate expansions and contractions of the coils are sufficient to remove the scale as the contractions and expansions cover a considerable length, and in the illustration shown, such movement is maintained for several inches in each direction.

The operator of the evaporator may assure substantially clean coils about every day or so, or on stated periods, by actuating the valve 50 to descale the said coils. The scale drops within the head 3 and then is removed through the clean-out 58. Casual inspection is made through the handhole 74 which also serves in the removal of scale from the top of the lower manifold. If a casual inspection reveals a damaged or a leaking coil, the bolts 15 may be removed from the door jamb and the door moved within the guides, whereupon the damaged coil may be brought within reach of the opening by the removal of bolts 27 from flanges 24 and 26, disconnecting the union 68 and rotating the coil assembly to the desired position.

It is obvious that the flanged connection 24, 25, 26 may be replaced by a stuffing box, in certain adaptations of the invention.

I claim:

1. An evaporator, including a tank, a pair of spaced manifolds within said tank, spaced helical coiled tubes secured between said manifolds and communicating therewith, a piston and a cylinder, the said piston secured to one of said manifolds and means for admittnig a fluid under pressure within the cylinder to move the piston and thereby cause flexing of the helical coils to the extent of travel of the piston.

2. In an evaporator including a tank, a pair of spaced apart manifolds therein, and helical coiled resilient tubes secured to and extending between the manifolds in communication with their interiors; one manifold being fixed and the other manifold being bodily movable in the tank for distortion of said coils, and fluid pressure responsive actuating means on the movable manifold operative from the tank exterior to move said movable manifold and thus distort said coils to the extent of manifold movement.

3. An evaporator comprising a tank, a manifold fixed therein, a manifold movable therein, helical coiled resilient tubes between and connecting said manifolds in communication, and motor means in the tank in operating connection with the movable manifold to move the same substantially for flexion of said tubes to the extent of movement of the manifold.

CHARLES O. SANDSTROM.

REFERENCES CITED

The following references are of record in the file of this patent:

UNITED STATES PATENTS

| Number | Name | Date |
| --- | --- | --- |
| 507,203 | Boschy | Oct. 24, 1893 |
| 824,947 | Nordstrom | July 3, 1906 |
| 1,028,777 | Power | June 4, 1912 |
| 1,124,096 | Zastrow | Jan. 5, 1915 |
| 1,223,106 | Power | Apr. 17, 1917 |
| 1,278,311 | Davis | Sept. 10, 1918 |
| 1,288,480 | Benjamin | Dec. 24, 1918 |
| 1,302,625 | Benjamin | May 6, 1919 |
| 1,735,683 | Hoffman | Nov. 12, 1929 |
| 1,941,587 | Stone et al. | Jan. 2, 1934 |
| 2,340,756 | Jacocks et al. | Feb. 1, 1944 |
| 2,351,163 | Thomas | June 13, 1944 |

FOREIGN PATENTS

| Number | Country | Date |
| --- | --- | --- |
| 560,705 | Germany | Oct. 6, 1932 |